United States Patent
Jin et al.

(10) Patent No.: US 11,223,641 B2
(45) Date of Patent: Jan. 11, 2022

(54) APPARATUS AND METHOD FOR RECONFIGURING SIGNATURE

(71) Applicant: WINS Co., Ltd., Seongnam-si (KR)

(72) Inventors: Yong Sig Jin, Gunpo-si (KR); Ji Yoon Hwang, Seongnam-si (KR)

(73) Assignee: WINS CO., LTD., Seongnam-si (KR)

( * ) Notice: Subject to any disclaimer, the term of this patent is extended or adjusted under 35 U.S.C. 154(b) by 425 days.

(21) Appl. No.: 16/420,836

(22) Filed: May 23, 2019

(65) Prior Publication Data
US 2019/0364066 A1    Nov. 28, 2019

(30) Foreign Application Priority Data
May 24, 2018  (KR) .......................... 10-2018-0059159

(51) Int. Cl.
*G06F 21/00* (2013.01)
*H04L 29/06* (2006.01)
*G06F 16/2458* (2019.01)

(52) U.S. Cl.
CPC ...... *H04L 63/1425* (2013.01); *G06F 16/2474* (2019.01); *H04L 63/1416* (2013.01)

(58) Field of Classification Search
CPC ............. H04L 63/1425; H04L 63/1416; G06F 16/2474
See application file for complete search history.

(56) References Cited

U.S. PATENT DOCUMENTS

| | | | |
|---|---|---|---|
| 2016/0219068 A1* | 7/2016 | Lee | G06N 20/00 |
| 2017/0011288 A1 | 1/2017 | Brothers et al. | |
| 2017/0149830 A1* | 5/2017 | Kim | H04L 63/1425 |
| 2018/0063178 A1* | 3/2018 | Jadhav | H04L 45/74 |
| 2018/0176247 A1* | 6/2018 | Smith | H04L 63/1458 |
| 2020/0036735 A1* | 1/2020 | Canard | H04L 63/1416 |

FOREIGN PATENT DOCUMENTS

| | | |
|---|---|---|
| KR | 101229012 B1 | 2/2013 |
| KR | 101631242 B1 | 6/2016 |
| KR | 101633649 B1 | 6/2016 |
| KR | 20160085593 A | 7/2016 |

* cited by examiner

*Primary Examiner* — Shin-Hon (Eric) Chen
(74) *Attorney, Agent, or Firm* — Miles & Stockbridge P.C.

(57) ABSTRACT

The present disclosure relates to an apparatus and method for reconfiguring a signature used in a signature-based abnormal traffic detection scheme. A signature reconfiguration method of the present disclosure comprises: selecting a signature from a signature list and dividing the selected signature into a plurality of signature fragments; calculating a first impact for each of a plurality of load elements by inspection of the plurality of signature fragments for the plurality of load elements; calculating a second impact for each of the plurality of load elements by applying a weight for each of the plurality of load elements to the first impact; calculating a final load impact for each signature fragment by summing corresponding second impacts to each signature fragment among the calculated second impacts; and rearranging an order of the plurality of signature fragments according to a magnitude of the calculated final load impact.

15 Claims, 9 Drawing Sheets

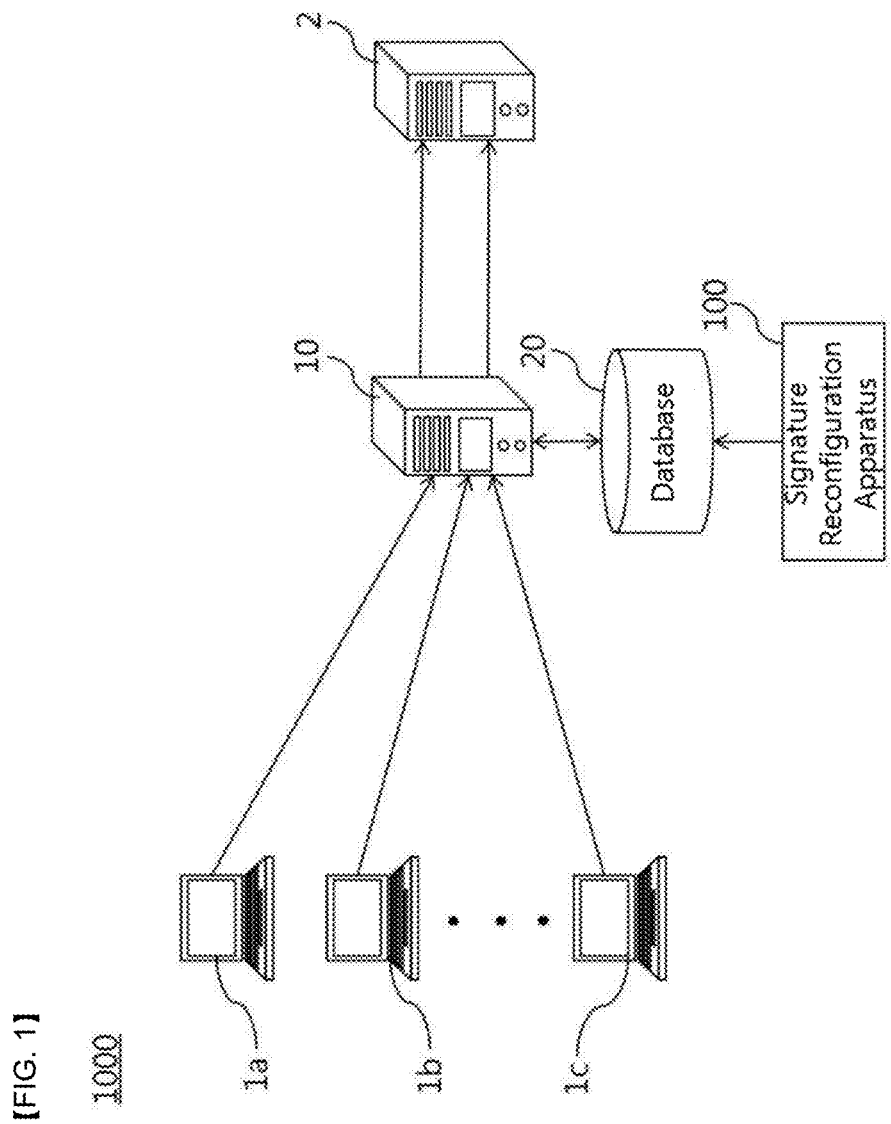

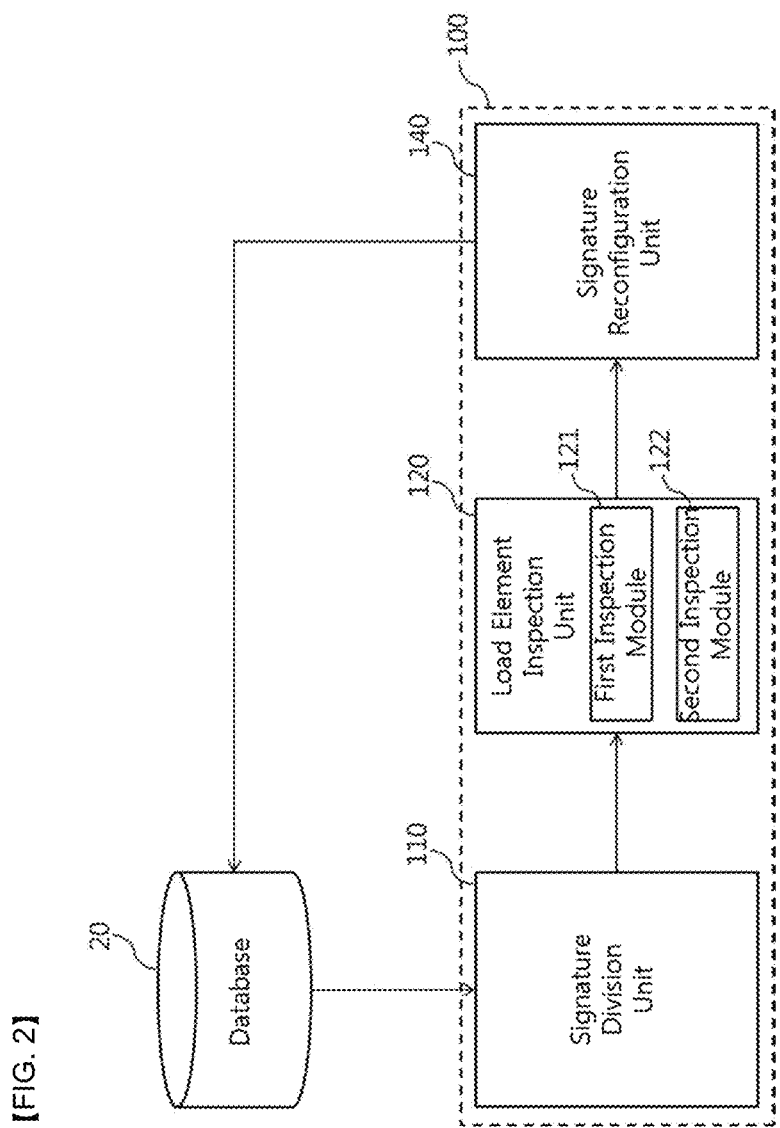
[FIG. 2]

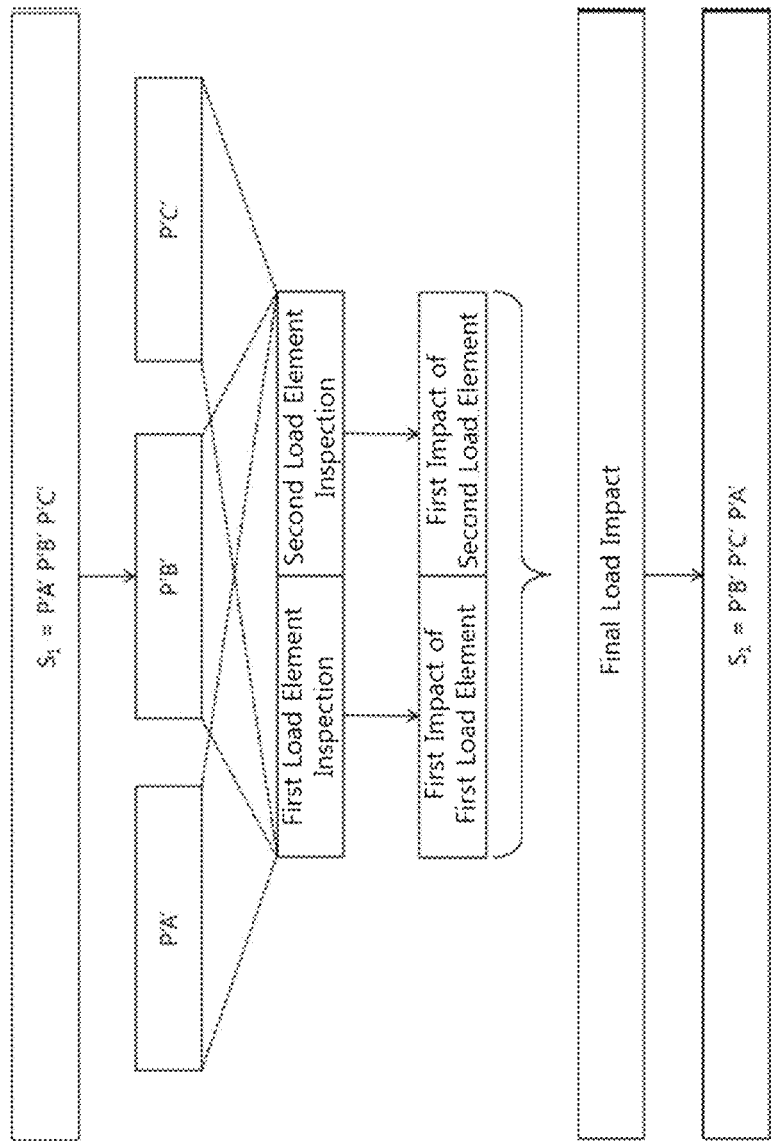
[FIG. 3]

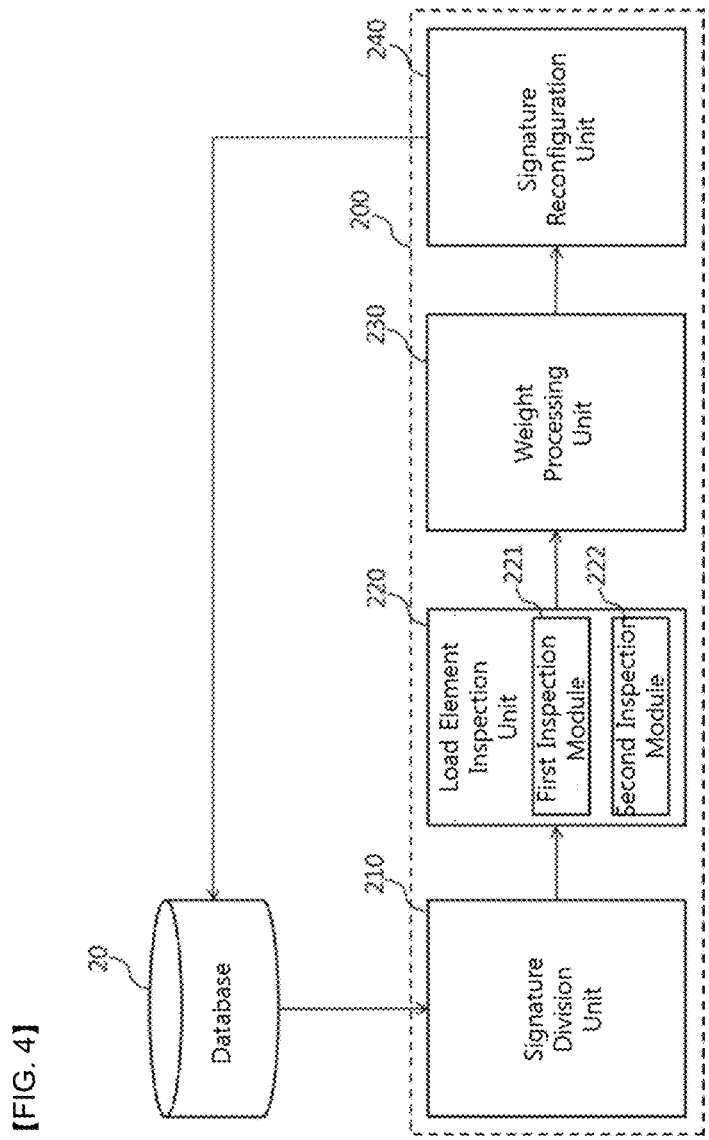
[FIG. 4]

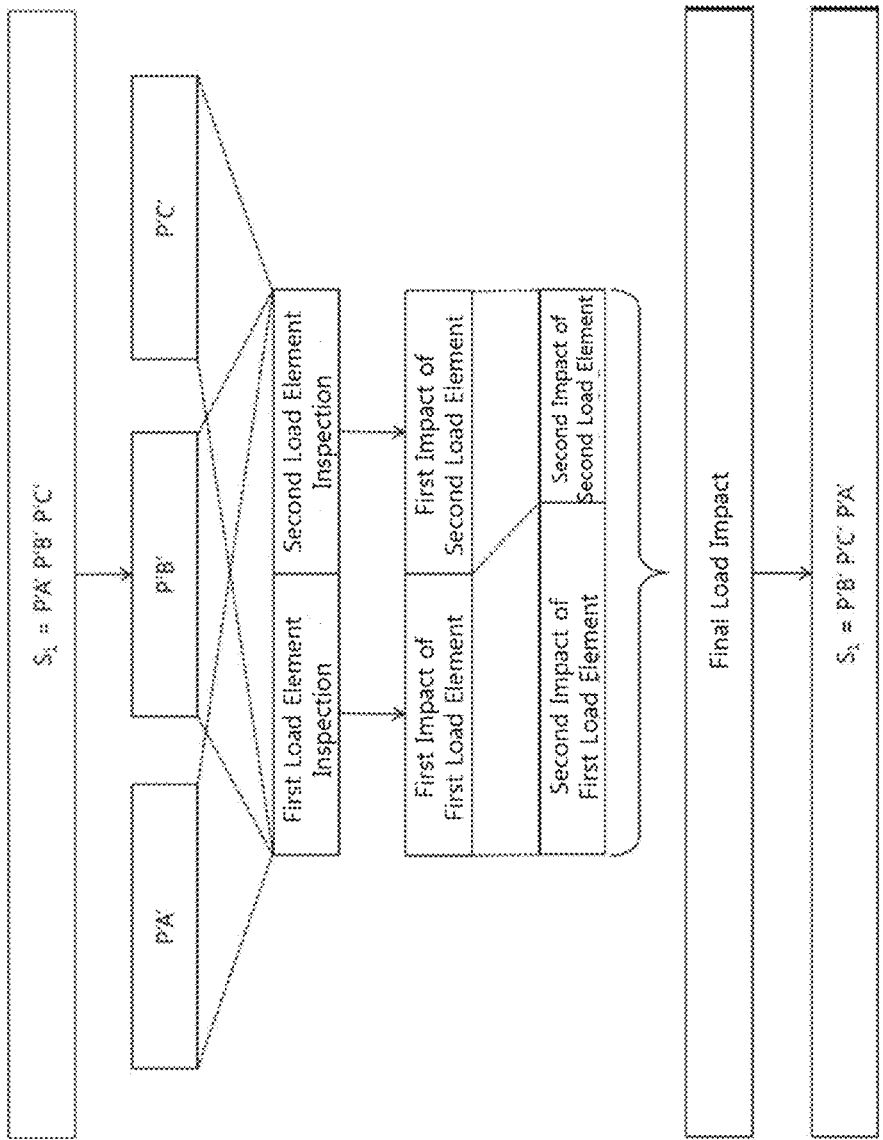

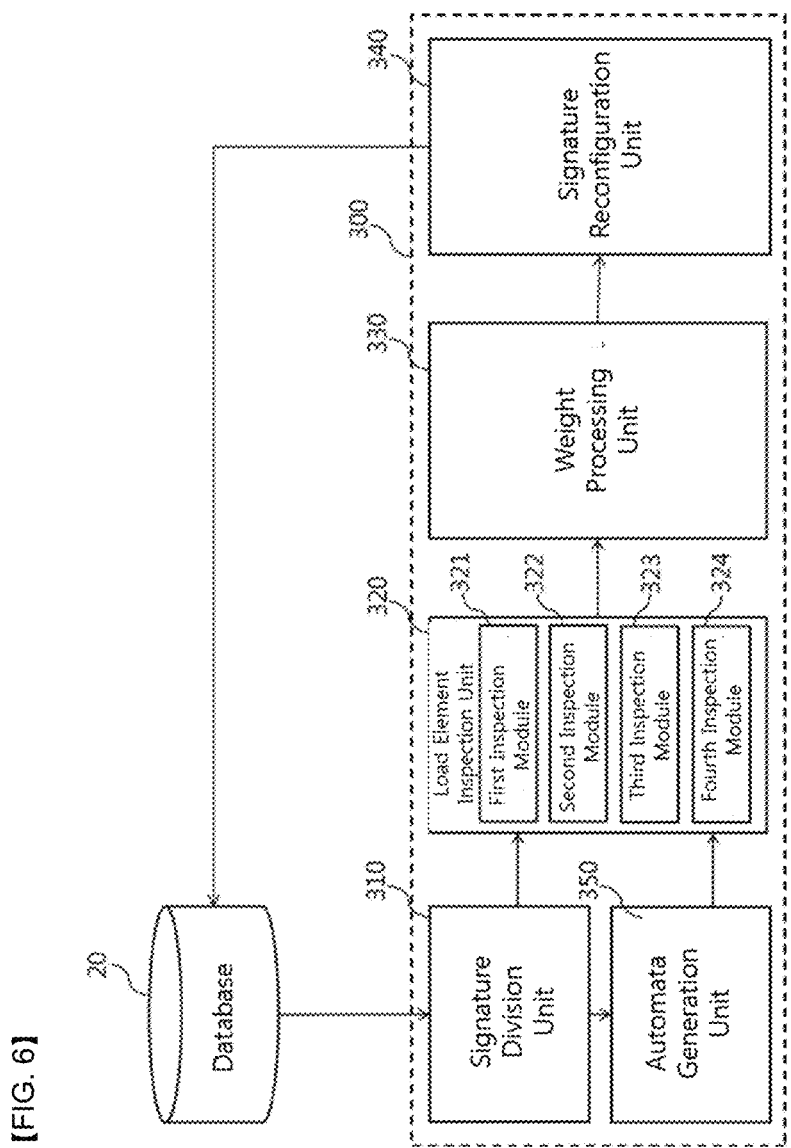
[FIG. 6]

[FIG. 7]
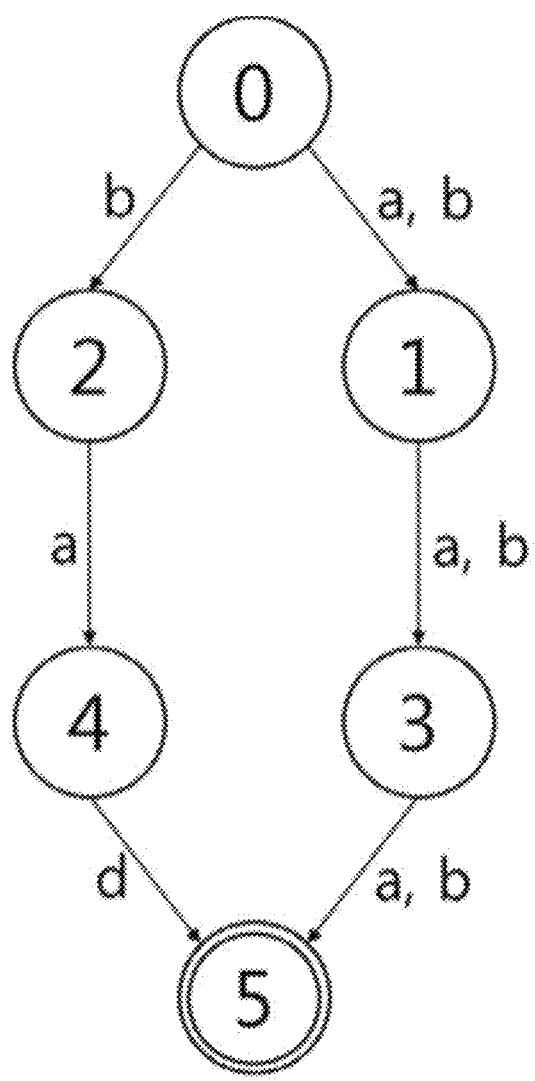

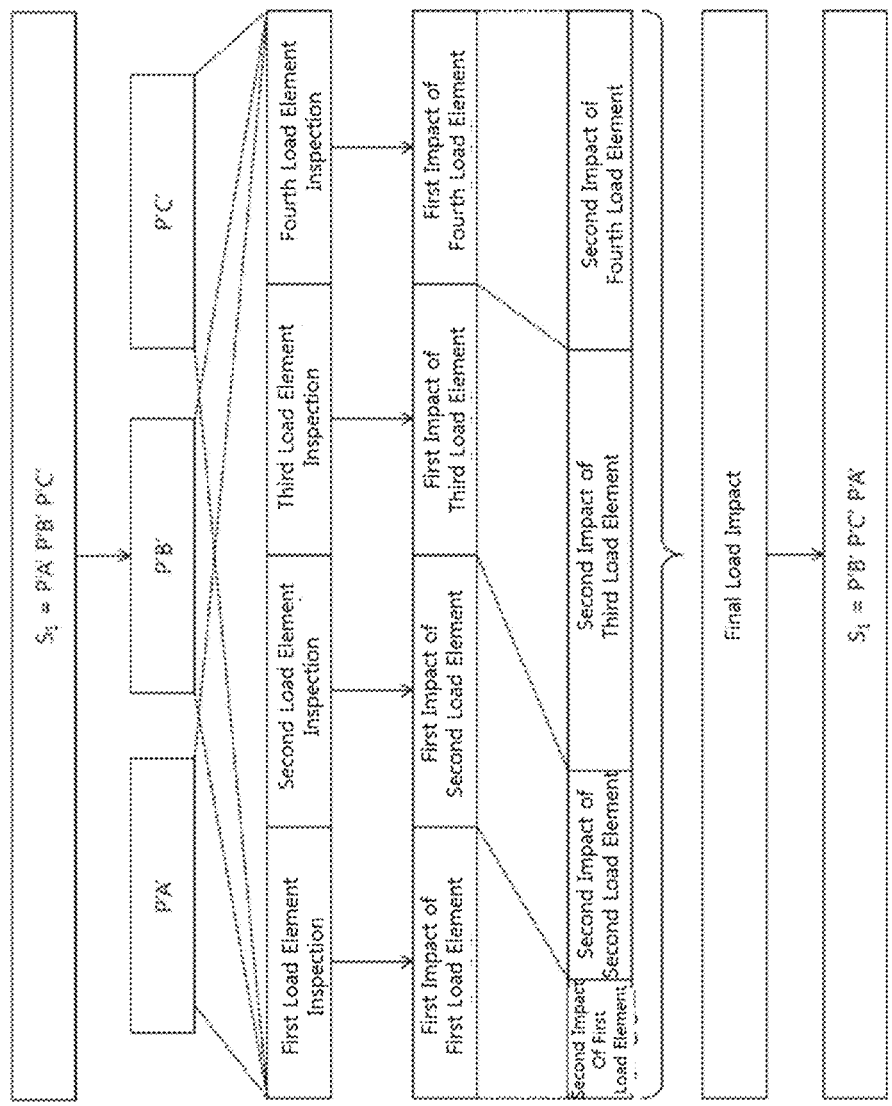
[FIG. 8]

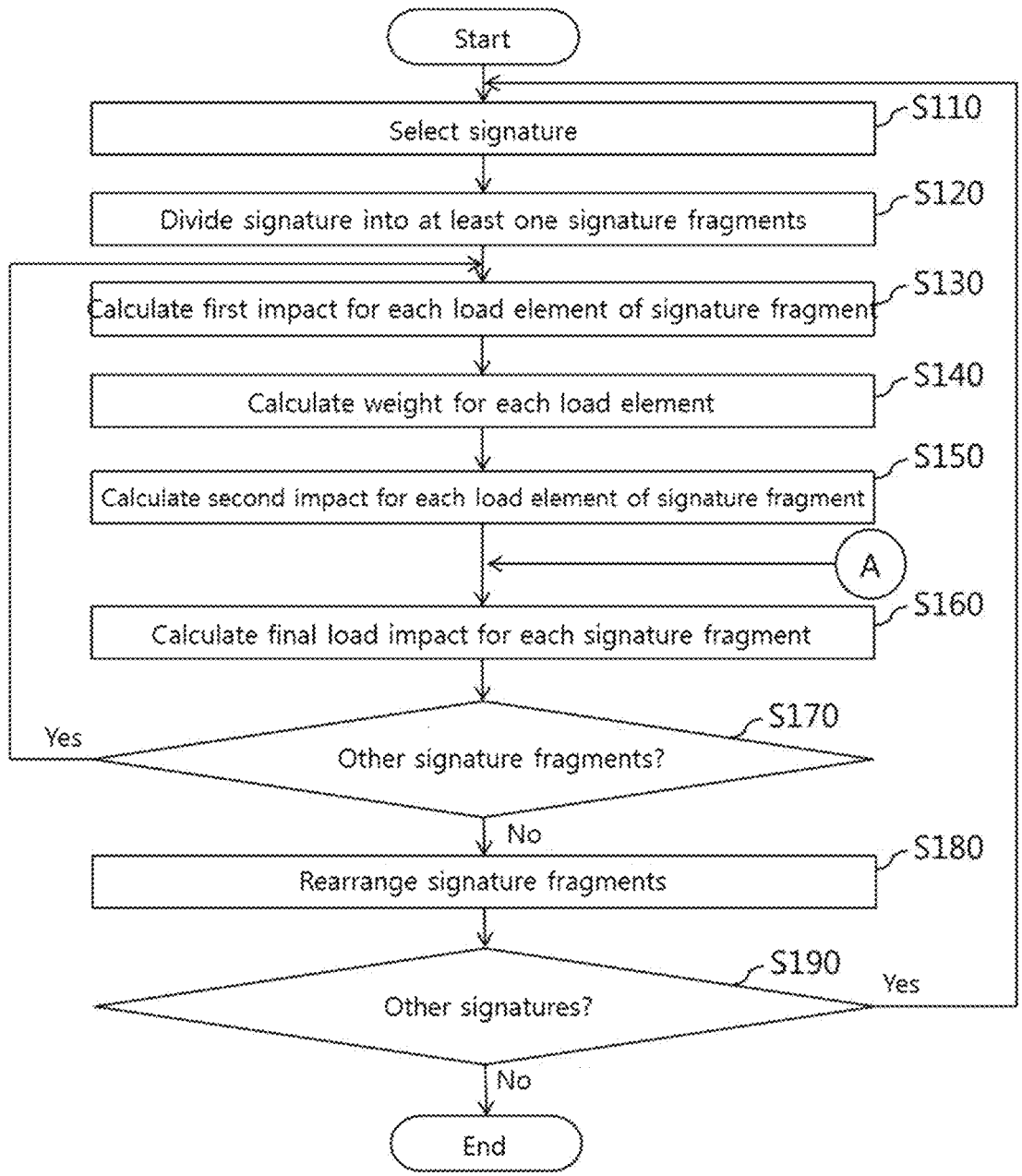
[FIG. 9]

APPARATUS AND METHOD FOR RECONFIGURING SIGNATURE

CROSS-REFERENCE TO RELATED APPLICATION

This application is based on and claims priority under 35 U.S.C. § 119(a) to Korean Patent Application No. 10-2018-0059159, which was filed on May 24, 2018, in the Korean Intellectual Property Office, the disclosure of which is incorporated herein in its entirety by reference.

BACKGROUND

1. Field

The present disclosure relates to an apparatus and method for reconfiguring a signature used in a signature-based abnormal traffic detection scheme, and more particularly, to a signature reconfiguration apparatus and method capable of optimizing each signature by rearranging an order of a plurality of signature fragments constituting the signature.

2. Description of the Related Art

With the spread of computers and Internet, ISPs (Internet Service Providers) are increasing. An ISP is a company that provides services such as Internet access and website building to an individual or an enterprise. ISPs provide extensive information and communication networks. However, as the number of ISPs increases, the adverse effects hereby are also rapidly increasing. In particular, worms, viruses, backdoors, and ransomware that cause abnormal traffic through P2P (Peer-to-Peer) application services and e-mail are widely spreading on the Internet. Their attack techniques are becoming more sophisticated and diversified. Since these attack techniques threaten the safety and reliability of the information and communication network, there is a need for measures to detect and respond to signs of the attack occurring in advance.

Signature-based abnormal traffic detection is one of the techniques for detecting abnormalities in the information and communication network. A signature indicates a characteristic of traffic. It signifies a bit pattern found only in a corresponding application protocol among messages exchanged over a network for performing a specific application protocol. Signatures may usually be stored in memory in the form of a regular expression.

A regular expression is a form of a language used to represent a set of strings with specific rules, and has been utilized primarily in text pattern matching in most applications, including various search engines, text editors, and so on. However, when a regular expression is formed in a highly flexible form (e.g., when a regular expression is represented as a data type indicating an unspecified expression or length or has a short length), the number of matched text patterns may be excessively increased and the amount of calculation may also be increased. In addition, if the range of matching is ambiguous, when it is expressed as data structure, regression of the search structure may occur frequently. As such, when a lot of iterative calculations occur due to frequent regressions in the search process, it is referred to as a 'high load cost'.

Meanwhile, an abnormal traffic detection scheme using a signature is performed by detecting a packet including the signature among packets transmitted to the server and determining whether the detected packet is an abnormal packet.

However, when a signature with a high load cost is used to detect abnormal traffic, the load of the security system is increased because it is necessary to check the abnormal traffic using a signature with a high load cost for each packet to be transmitted. Such a problem may become very serious if a large-scale attack such as DDoS (Distributed Denial of Service Attack) occurs. Therefore, a new method is needed to reconfigure the signatures used to detect abnormal traffic, taking into account the load cost.

SUMMARY

An object of the present disclosure is to provide a signature reconfiguration apparatus and method which is applied to a network device that detects abnormal traffic based on a signature and capable of calculating an impact of each element that affects a search time in a process of converting a plurality of signatures into a searchable data structure and rearranging the order of signature fragments constituting the signature through the optimization process based on the impact of each element.

In order to solve the above problems, a signature reconfiguration method for signature-based abnormal traffic detection is provided according to the present disclosure, which comprises: selecting a signature from a signature list stored in a database and dividing the selected signature into a plurality of signature fragments; calculating a first impact for each of a plurality of load elements by inspection of the plurality of signature fragments for the plurality of load elements; calculating a second impact for each of the plurality of load elements by applying a weight for each of the plurality of load elements to the first impact; calculating a final load impact for each signature fragment by summing up the corresponding second impact to each signature fragment among the calculated second impact for each of the plurality of load elements; and rearranging an order of the plurality of signature fragments according to a magnitude of the calculated final load impact.

Further, at least two of the weights for the plurality of load elements may be different from each other.

Further, the weight may be adjusted according to at least one of a signature configuration, a pattern search algorithm, and a specification of a security device performing signature-based abnormal traffic detection, respectively.

Further, the inspection for the plurality of load elements comprises a syntax inspection of a pattern included in the signature fragment, and the step of calculating the first impact may comprise calculating the first impact according to the syntax of the pattern included in the signature fragment.

Further, the inspection for the plurality of load elements comprises a length inspection of the signature fragment, and the step of calculating the first impact may comprise calculating the first impact according to the length inspection so that a magnitude of the first impact increases as the length of the signature fragment decreases.

Further, the inspection for the plurality of load elements comprises an inspection of a size of active states of automata for the signature fragment, and the step of calculating the first impact may comprise calculating the first impact according to the size of active states of the automata of the signature fragment.

Further, the inspection for the plurality of load elements comprises an inspection of a size of a search space for active states of automata for the signature fragment, and the step of calculating the first impact may comprise calculating the first impact according to the size of the search space for active states of automata of the signature fragment.

Further, signature reconfiguration method according to the present disclosure further comprises determining whether the plurality of signature fragments match a certain penalty condition and assigning a penalty value to the signature fragment that matches the penalty condition, and the step of calculating the final load impact for each signature fragment may comprise a step of adding the assigned penalty value to the calculated final load impact in case of the signature fragment to which the penalty value is assigned.

A signature reconfiguration apparatus for signature-based abnormal traffic detection of the present disclosure in order to solve the above problems comprises: a signature division processor for selecting a signature from a signature list stored in a database and dividing the selected signature into a plurality of signature fragments; a load element inspection processor for inspecting the plurality of signature fragments for a plurality of load elements to calculate a first impact for each of the plurality of load elements; a weight processing processor for applying a weight for each of the plurality of load elements to the first impact to calculate a second impact for each of the plurality of load elements; and a signature reconfiguration processor for calculating a final load impact for each signature fragment by summing up the corresponding second impact to each signature fragment among the calculated second impact for each of the plurality of load elements and rearranging an order of the plurality of signature fragments according to a magnitude of the calculated final load impact.

A signature reconfiguration apparatus for signature-based abnormal traffic detection of the present disclosure in order to solve the above problems may comprise a control processor for performing a method described above.

The signature reconfiguration apparatus and method according to an embodiment of the present disclosure may configure a more optimized search environment by rearranging the order of signature fragments included in each signature based on load elements which are considered to be main factors.

In addition, the signature reconfiguration apparatus and method according to an embodiment of the present disclosure may reflect the influence of signatures, hardware devices, network, and the like to the load impact as an arithmetic value.

BRIEF DESCRIPTION OF THE DRAWINGS

The above and other aspects, features, and advantages of certain embodiments will be more apparent from the following detailed description taken in conjunction with the accompanying drawings, in which:

FIG. 1 is a conceptual diagram of an abnormal traffic detection system according to an embodiment of the present disclosure.

FIG. 2 is a block diagram of a signature reconfiguration apparatus according to a first embodiment of the present disclosure.

FIG. 3 is a conceptual diagram for explaining a method of reconfiguring a signature using the signature reconfiguration apparatus according to the first embodiment of the present disclosure.

FIG. 4 is a block diagram of a signature reconfiguration apparatus according to a second embodiment of the present disclosure.

FIG. 5 is a conceptual diagram for explaining a method of reconfiguring a signature using the signature reconfiguration apparatus according to the second embodiment of the present disclosure.

FIG. 6 is a block diagram of a signature reconfiguration apparatus according to a third embodiment of the present disclosure.

FIG. 7 illustrates an example of automata generated by the automata generation unit.

FIG. 8 is a conceptual diagram for explaining a method of reconfiguring a signature using the signature reconfiguration apparatus according to the third embodiment of the present disclosure.

FIG. 9 is a flowchart of a signature reconfiguration method according to an embodiment of the present disclosure.

DETAILED DESCRIPTION

The present disclosure will now be described in detail with reference to the accompanying drawings. Hereinafter, a repeated description and a detailed description of known function and configuration that may obscure the gist of the present disclosure will be omitted. Embodiments of the present disclosure are provided to more fully describe the present disclosure to those skilled in the art. Accordingly, shapes, sizes and the like of the elements in the drawings can be exaggerated for clarity.

FIG. 1 is a conceptual diagram of an abnormal traffic detection system 1000 according to an embodiment of the present disclosure. The abnormal traffic detection system 1000 according to an embodiment of the present disclosure includes a plurality of clients 1a, 1b, 1c, a server 2, a security device 10, a database 20 and a signature reconfiguration apparatus 100. The signature reconfiguration apparatus 100 may be mounted inside the security device 10, installed in the form of software, or directly connected to the security device 10 in the form of a separate device. In FIG. 1, the number of clients is shown to be three, but this is only an example, and various numbers of clients may be included depending on the actual environment.

The security device 10 functions to detect abnormal traffic by analyzing packets transmitted from the plurality of clients 1a, 1b, 1c. Here, the security device 10 uses a detection pattern list (hereinafter, a signature list) stored in the database 20 to analyze a packet (or a payload included in the packet) transmitted from the plurality of clients 1a, 1b, 1c to the server 2 and detect abnormal traffic. Specifically, the security device 10 performs a process of collecting the packets and sequentially comparing the contents of the packets with the signatures included in the signature list. Here, each signature includes at least one signature fragment, and the pattern of signature fragment may have the form of a regular expression.

For example, it is assumed that a first client 1a among the plurality of clients 1a, 1b, 1c sends a packet. The security device 10 may analyze the packet transmitted by the first client 1a and extract the contents of the packet. Thereafter, the security device 10 compares whether the contents of the packet transmitted by the first client 1a correspond to each signature stored in the database 20. As described above, the database 20 includes the signature list including a plurality of signatures, each signature including a plurality of signature fragments represented by a regular expression. As an example for the description of the present disclosure, it is assumed that the signature list includes n signatures, and each signature is expressed as Equation 1 below.

$$S_1 = P'A'P'B'P'C'$$

$$S_2 = P'D'P'E'P'F'P'G$$

$$S_n = P'X'P'Y'P'Z' \qquad (1)$$

In Equation 1, $S_n$ represents the n-th signature, and P' represents the signature fragment included in the signature. In Equation 1, different characters of A, B, C, D, E, F, G, X, Y and Z are used to distinguish each signature fragment, but at least one of them may be the same.

In this example, the security device 10 may sequentially compare the contents of the packet transmitted by the first client 1a with the n signatures $S_1, S_2, \ldots, S_n$ stored in the database 20. For example, the security device 10 compares the contents of the packet with the pattern of the first signature fragment P'A' included in the first signature $S_1$ and determines if the contents of the packet match the pattern of the first signature fragment P'A' in the first signature $S_1$. As a result of the determination, if the contents of the packet match the pattern of the first signature fragment P'A' included in the first signature $S_1$, the security device 10 compares the contents of the packet with the pattern of the second signature fragment P'B' included in the first signature $S_1$. If the contents of the packet match the pattern of the second signature fragment P'B' included in the first signature $S_1$, the security device 10 compares the contents of the packet with the pattern of the third signature fragment P'C' included in the first signature $S_1$. As a result of the determination, if the contents of the packet match the pattern of the third signature fragment P'C' included in the first signature $S_1$ as well, the security device 10 determines that the packet is abnormal traffic corresponding to the first signature $S_1$ and discards the received packet.

On the contrary, if the contents of the packet do not match at least one of the patterns of the signature fragments P'A', P'B', P'C' included in the first signature $S_1$, the security device 10 compares the contents of the packet with the pattern of the first signature fragment of the next signature (second signature $S_2$ in this example). The process of comparing the contents of the packet with the second signature $S_2$ to the n-th signature $S_n$ performed in the security device 10 is substantially the same as the process of comparing the packet with the first signature $S_1$ and thus a duplicated description will be omitted.

The security device 10 sequentially compares the contents of the packet with each signature, and, if the contents of the packet match at least one signature, the security device 10 determines that the packet is abnormal traffic and discards it. Conversely, if the contents of the packet do not match any of the signatures, the security device 10 determines that the packet transmitted by the first client 1a is normal traffic, and forwards the packet to the server 2.

As described above, the security device 10 performs a comparison process on the packets received from clients in the order of the signatures belonging to the signature list and in the order of the signature fragments included in the respective signatures. That is, the complexity of the abnormal traffic inspection process performed by the security device 10 may be determined according to the arrangement of the signature fragments.

The signature reconfiguration apparatus 100 according to an embodiment of the present disclosure analyzes the signature list in the database 20 used by the security device 10 and rearranges the order of each signature included in the signature list according to the result of analysis, thereby the efficiency of abnormal traffic inspection may be increased. The signature reconfiguration apparatus 100 according to an embodiment of the present disclosure considers the following when reconfiguring each signature.

First, the signature reconfiguration apparatus 100 according to an embodiment of the present disclosure may check regular expression syntax. Specifically, the signature reconfiguration apparatus 100 according to an embodiment of the present disclosure checks whether a regular expression syntax indicating an unspecified length or an unspecified data type (e.g., a meta character, a character class, etc.) is included in a signature fragment or not. As described above, when a regular expression is represented as a simple data structure, some signature fragments contain attack patterns explicitly while other signature fragments may contain regular expression syntax indicating an unspecified length or an unspecified data type (e.g., "*", "+", ",{x,}" etc.). However, the syntax indicating an unspecified length or an unspecified data type is highly likely to match the data included in normal traffic.

For example, it is assumed that P'A' is "* g", P'B' is "abcd", and P'C' is "12345jpg" in the first signature $S_1$ and the contents of the incoming packet include contents of "bcc345defg". It is also assumed that "*" means a character string of any length. Since "*g" in P'A' represents any character string whose last character is g (e.g., "g", "baaag", "bcdddsg", "baabbaag", etc.), matching probability will be higher than other patterns such as text.

In this example, the security device 10 compares the contents of the packet with "*g" which is the first signature fragment P'A' of the first signature $S_l$. Here, since the last character of the packet transmitted by the security device 10, which has contents of "bcc345defg", is "g", the security device 10 determines that the contents of the packet match the first signature fragment P'A' of the first signature $S_1$ and it will compare the contents of the packet with the second signature fragment P'B'. The security device 10 then compares the contents of the packet with "abcd" which is the second signature fragment P'B' of the first signature $S_1$. In this example, since the contents of the packet and the second signature fragment P'B' of the first signature $S_1$ do not match, the security device 10 will compare the contents of the packet with the second signature $S_2$.

As another example, it is assumed that the first signature $S_1$ is configured in the order of P'B'-P'C'-P'A'. The security device 10 will compare the contents of the packet with P'B', which is the first signature fragment of the first signature $S_1$. In this case, since the contents of the packet and the first signature fragment P'B' of the first signature $S_1$ do not match, the security device 10 may directly compare with the second signature $S_2$ without additional comparison process with the first signature $S_1$.

As such, if a signature fragment including an unspecified length or an unspecified data type, such as a meta character or a character class, is preferentially placed in the signature, there is a high probability that the second signature fragment of the signature is examined as many times as the number of different combinations of character strings, which is possible due to the meta character or character class, even if the packet transmitted from the client is a normal packet. In other words, the inspection efficiency of abnormal traffic using these signatures will be significantly decreased. On the other hand, if a signature fragment including an unspecified length or a character of an unspecified data type is placed in the later part of the signature so that it may be compared later, it is possible to improve the efficiency of abnormal traffic inspection using this signature.

Second, the signature reconfiguration apparatus 100 according to an embodiment of the present disclosure consider the pattern length. One signature may have a plurality of signature fragments, and each signature fragment may have a pattern length different from one another. Generally, in signature fragments, relatively long signature fragment may be seen as sparsely populated. On the other hand, a short signature fragment has a high probability of matching with the contents of the packet, and thus, there is a possibility of causing a high load in the preprocessing process. Therefore, a low load impact may be given to a signature fragment having a high scarcity that is within a certain length range, and a high load impact may be given to a signature fragment having a low scarcity (e.g., a signature fragment whose character length is less than a certain length). Also, when the length is out of the defined range, the load impact may be additionally given in consideration of the occurrence of the matching cost. Here, the load impact indicates a degree of the load to be generated in the security device or the network by the load element described below.

As such, the signature reconfiguration apparatus 100 according to an embodiment of the present disclosure may reconfigure each signature using the existence of the meta character or the character class and the pattern length included in the signature fragment as described above. In addition, further consideration may be selectively given to the matters described below in the signature reconfiguration apparatus 100 according to an embodiment of the present disclosure.

The signature reconfiguration apparatus 100 according to an embodiment of the present disclosure may further consider the size of active states of the automata. The automata may include a plurality of states, and a large size of active states of the automata means that the number of states is large, which means that a lot of state transitions should be made in the process of searching a character string. As the number of automata states is larger, the more conditions should be met to be matched. Thus, since the period to keep the transition states and the active state are continuously changed, the period for searching the entire automata may directly affect the search load.

In addition, the signature reconfiguration apparatus 100 according to an embodiment of the present disclosure may further consider the size of the search space of active states of the automata. The size of the search space of active states of the automata is another factor that may represent the load impact separately from the number of active states. When the size of the search space increases, the load impact also increases proportionally. Here, the size of the search space for active states of the automata represents the memory space reserved for the regular expression syntax, which has an ambiguous matching range or needs to calculate iteratively, regardless of the number of active states of the automata. Before determining whether to match based on the regular expression, the size of the search space of active states of the automata may be recognized as the size of the space that stores all possible character strings. For example, in a regular expression, the character '*' has the meaning of a "character string of any length". Therefore, assuming that there is a pattern of "*.co.kr", information about all character strings "likely to contain .co.kr" internally should be stored in the memory until .co.kr is detected. The size of the storage space at this time may be defined as the size of the search space of active states of the automata.

FIG. 2 is a block diagram of a signature reconfiguration apparatus 100 according to a first embodiment of the present disclosure. The signature reconfiguration apparatus 100 according to the first embodiment of the present disclosure may reconfigure the arrangement order of each signature fragment included in the signature so that the signature-based abnormal traffic detection can be efficiently performed. For this reason, the signature reconfiguration apparatus 100 according to the first embodiment of the present disclosure includes a signature division unit 110, a load element inspection unit 120 and a signature reconfiguration unit 140. Here, the signature division unit 110, the load element inspection unit 120, and the signature reconfiguration unit 140 are classified according to their functions in order to facilitate understanding of the present disclosure. The signature reconfiguration apparatus 100 may be implemented in the form of a single control unit or software. The signature reconfiguration apparatus 100 may also be implemented as a single-core or multi-core CPU, MPU (microprocessor unit), or the like.

The database 20 may store a plurality of signatures in the form of a signature list. The signature division unit 110 may select one of the signatures stored in the database 20 and divide the signature into a plurality of signature fragments. For example, the signature division unit 110 may be a parser, which receives a signature to divide it into a plurality of signature fragments (e.g., units that can interpret the syntax) considering the character string pattern, regular expression syntax and the like. In addition, the signature division unit 110 may be configured to read out a signature from a compiler or an interpreter and perform a parsing process to find out the structure. The signature division scheme performed by the signature division unit 110 is not limited to a specific scheme and it can be performed in various ways.

The load element inspection unit 120 calculates the first impact for each load element for each of the signature fragments divided by the signature division unit 110. Here, the load elements include at least one of: whether the regular expression syntax indicating an unspecified length or an unspecified data type is included in the signature fragment; the pattern length of the signature fragment; the size of active states of the automata; and the size of the search space of active states of the automata. In the first embodiment of the present disclosure, it is described that the load element inspection unit 120 performs inspection for two load elements among those described above, but this is merely an example. The inspection performed by the load element inspection unit 120 is not limited to those two load elements, but other load elements can be added. In the following description, it is assumed that the first inspection module 121 considers the presence of a regular expression syntax indicating an unspecified length or an unspecified data type, and the second inspection module 122 considers the pattern length of the signature fragment.

The first inspection module 121 checks whether regular expression syntax indicating an unspecified length or an unspecified data type (e.g., meta character, character class) is contained in each signature fragment included in the signature (e.g., the first signature) selected from the database 20 and assigns the impact accordingly. There are a variety of regular expression syntaxes indicating unspecified lengths or unspecified data types (e.g., meta characters, character classes, etc.) and the load to be caused in the security device 10 performing abnormal traffic detection for each regular expression syntax (e.g., meta character or character class) is also different. Accordingly, the first inspection module 121 identifies the presence and type of the regular expression syntax indicating the unspecified length or the unspecified data type, and assigns a different load impact depending on the presence or type thereof.

For example, if the first inspection module 121 determines that there is no regular expression syntax indicating an unspecified length or an unspecified data type in the signature fragment, the first inspection module 121 sets the first impact to a default value (e.g., 0 or other value which is relatively low compared to the first impact of other load element). On the other hand, if it is confirmed that the regular expression syntax indicating an unspecified length or an unspecified data type exists in the signature fragment, the first inspection module 121 sets the first impact of the first load element to a predetermined value according to the corresponding regular expression syntax (e.g., meta character, character class, etc.). Thus, a signature fragment that contains a regular expression syntax with a relatively low load impact, among regular expression syntaxes indicating unspecified lengths or unspecified data types, may be set to a low impact value. Conversely, a signature fragment containing a regular expression syntax with a relatively high load impact may be set to a high impact value.

The second inspection module 122 identifies the pattern length of the signature fragment and assigns different impacts according to the pattern length. As described above, a pattern with a relatively long length may be regarded as having a high degree of scarcity, and a pattern with a relatively short length may be regarded as having a low degree of scarcity. In addition, a pattern with a relatively short length has a high probability of matching with a packet, which may cause a high load. Accordingly, the second inspection module 122 identifies the pattern length of the signature fragment and gives a higher value to the first impact of the second load element as the pattern length is shorter. For example, the second inspection module 122 compares the pattern length of the signature fragment with a plurality of pattern length determination ranges, and sets a different value as the first impact of the second load element according to the pattern length determination range to which the pattern length of the signature fragment belongs. In addition, when the pattern length is less than the predetermined pattern length determination range, the second inspection module 122 may additionally give the load impact in consideration of occurrence of the matching cost.

As described with reference to FIG. 1, the signature reconfiguration apparatus 100 according to an embodiment of the present disclosure may reconfigure signatures by emphasizing the load factor considered to be a major load element in abnormal traffic detection. To this end, the signature reconfiguration apparatus 100 according to an embodiment of the present disclosure further includes a signature reconfiguration unit 140.

The signature reconfiguration unit 140 calculates the final load impact for each signature fragment using the first impact of each load element for each signature fragment calculated by the load element inspection unit 120. Assuming, for example, that the first impact of the first load element of the first signature fragment is 20 and the first impact of the second load element of the first signature fragment is 50, then the final load impact is 70, which is the sum of the first impact of the first load element and the first impact of the second load element. The signature reconfiguration unit 140 performs the process of summing the first impacts calculated by the load element inspection unit 120 for each signature fragment, thereby calculating the final load impact for each signature fragment.

In addition, the signature reconfiguration unit 140 calculates the final load impact for each signature fragment of the signature selected from the database 20, and rearranges the signature fragments according to the final load impact. For example, the signature reconfiguration unit 140 compares the final load impacts of the signature fragments with each other and rearranges the signature fragments and the signature fragment having a lower final load impact on the front of the signature and rearranging a signature fragment having a higher final load impact on the rear of the signature.

FIG. 3 is a conceptual diagram for explaining a method of reconfiguring a signature using the signature reconfiguration apparatus 100 according to the first embodiment of the present disclosure. In the example shown in FIG. 3, it is assumed that a first signature $S_1$ has been selected from the database 20, and the first signature $S_1$ includes a first signature fragment P'A', a second signature fragment P'B' and a third signature fragment P'C' in the order of P'A'-P'B'-P'C'. Further, it is assumed that the load element inspection unit 120 performs inspection for two load elements.

The signature division unit 110 analyzes the first signature $S_1$ in consideration of the character string pattern, the regular expression syntax, and the like, and divides the first signature $S_1$ into a plurality of signature fragments according to the analysis result. In this example, the signature division unit 110 divides the first signature $S_1$ into a first signature fragment P'A', a second signature fragment P'B', and a third signature fragment P'C' according to the above assumption.

The load element inspection unit 120 calculates the first impact of the load element for each of the signature fragments P'A', P'B', P'C' divided by the signature division unit 110. For example, if it is assumed that the load element inspection unit 120 performs inspection for two load elements, the load element inspection unit 120 may calculate the first impact for each signature fragment in the order of signature fragments. For example, the load element inspection unit 120 sequentially calculates the first impacts of the first and second load elements with respect to the first signature fragment P'A', calculates the first impacts of the first and second load elements with respect to the second signature fragment P'B', and calculates the first impacts of the first and second load elements with respect to the third signature fragment P'C'. As another example, the load element inspection unit 120 may calculate the first impact for each signature fragment in the order of load elements. For example, the load element inspection unit 120 may sequentially check the first, second and third signature fragments P'A', P'B', P'C' for the first load element and check the first, second and third signature fragments P'A', P'B', P'C' for the second load element to calculate the first impact of each load element for each signature fragment. The order of calculating the first impact by the load element inspection unit 120 is not limited to the above order, and combinations thereof or a reverse order is also possible. Also, in the above description, the calculation of the first impact by the load element inspection unit 120 is sequentially performed in the order of the signature fragments or in the order of the load elements. However, this calculation process may be performed simultaneously in parallel.

The signature reconfiguration unit 140 calculates the final load impact for each signature fragment by summing the first impacts for each signature fragment calculated by the load element inspection unit 120. Then, the signature reconfiguration unit 140 compares the final load impacts of each signature fragment, and places a signature fragment with a relatively low final load impact at the front of the signature and a signature fragment with a relatively high final load impact at the rear of the signature to reconfigure the signature.

For example, it is assumed that the result calculated by the signature reconfiguration unit 140 is that the final load impact of the first signature fragment P'A' is 70, the final load impact of the second signature fragment P'B' is 60, and the final load impact of the third signature fragment P'C' is 80. Then, the signature reconfiguration unit 140 takes the magnitudes of the final load impacts of respective signature fragments into consideration and reconfigures the first signature $S_1$ in the order of the second signature fragment P'B', the first signature fragment P'A', and the third signature fragment P'C'. As another example, if the result calculated by the signature reconfiguration unit 140 is that the final load impact of the first signature fragment P'A' is 80, the final load impact of the second signature fragment P'B' is 30, and the final load impact of the third signature fragment P'C' is 50, the signature reconfiguration unit 140 may rearrange the first signature $S_1$ in the order of the second signature fragment P'B', the third signature fragment P'C', and the first signature fragment P'A' considering the magnitudes of the final load impacts of the respective signature fragments.

FIG. 4 is a block diagram of a signature reconfiguration apparatus 200 according to a second embodiment of the present disclosure. The signature reconfiguration apparatus 200 according to the second embodiment of the present disclosure may include a signature division unit 210, a load element inspection unit 220, a weight processing unit 230, and a signature reconfiguration unit 240. The signature division unit 210, the load element inspection unit 220, the weight processing unit 230, and the signature reconfiguration unit 240 are classified according to their functions in order to facilitate understanding of the present disclosure. The signature reconfiguration apparatus 200 may be implemented in the form of a single control unit or software. The signature reconfiguration apparatus 200 may also be implemented as a single-core or multi-core CPU, MPU, or the like. The second embodiment of the present disclosure is substantially the same as the first embodiment except that the signature reconfiguration apparatus 200 further includes a weight processing unit 230 and that the signature reconfiguration unit 240 reconfigures the signature using the weight processing unit 230. Therefore, the following description is made mainly on the differences from the first embodiment.

The weight processing unit 230 calculates weights for a plurality of load elements and reflects the weights for the plurality of load elements to the first impact of each load element output from the load element inspection unit 220, thereby calculating the second impact. That is, the weight processing unit 230 adjusts the first impact values by reflecting the weight values to the first impact of each load element. The reason why the weight is considered through the weight processing unit 230 is that the performance (e.g., the CPU specification, the memory capacity, etc.) of the security device 10 and the communication environment to which the signature reconfiguration apparatus or method according to the embodiment of the present disclosure is applied may be different. For example, the configuration (e.g., simple text or regular expression) of each signature fragment may be highly affective to the load of the security device 10 in some circumstances, while it may not in other circumstances. Therefore, the weight processing unit 230 calculates weights for the respective load elements in consideration of the following matters, and controls the magnitudes of the first impacts output from the load element inspection unit 220 using the calculated weights.

First, the weight processing unit 230 considers the configuration of the signature stored in the database 20 referred to as the first load element. The signatures may consist of simple text only, or may consist of multiple loops and character strings containing regular expressions. For example, if most of the signatures in the signature list stored in the database 20 are made up of simple texts only, the load impact caused by the signature's syntax will be significantly lower.

Accordingly, the weight processing unit 230 checks the ratio of the signature fragments having the simple text only over the entire signature and if the ratio exceeds the predetermined ratio (e.g., 30%, 40%, 50%, etc.), the weight for the first load element may be increased. In an embodiment, the weight processing unit 230 may determine the weight of the first load element to be relatively high compared to other weights, if the ratio of the simple text in the signature configuration exceeds a predetermined ratio.

The weight processing unit 230 may also check the pattern search algorithm used by the security device 10 and set the weight of the second load element to a higher or lower value depending on the type of the pattern search algorithm. The network environment to which the security device 10 is applied may be limited to a specific service network as well as Internet network in which various traffic flows. Different pattern search algorithms may be applied to the security device 10 depending on the network to which the security device 10 is to be applied, and some pattern search algorithm may be a method in which a character string search time is lengthened according to a pattern length. Accordingly, the weight processing unit 230 may adjust the weight of the second load element by checking the pattern search algorithm used by the security device 10.

The weights are not fixed values for respective load elements. The weighting may be made variable considering the configuration of the signature, the characteristics of the physical device of the operating equipment, and the traffic characteristics of the network operating the equipment.

Also, the weight processing unit 230 may confirm whether additional adjustment is necessary for the second impact of each load element. For example, the weight processing unit 230 may check the penalty information and use penalty information to determine if further adjustment to the final load impact of the signature fragments described below are necessary. The penalty information is information including a penalty condition for determining whether to give additional load impact to the signature fragment. That is, in addition to the arithmetic load determination criteria in the inspection process of each load element by the load element inspection unit 220, the penalty information may be used when determining whether the signature fragment matches the additional penalty condition included in the penalty information through an additional determination process. If matching with an additional determination condition (e.g., a penalty condition) included in the penalty information occurs, the weight processing unit 230 assigns a penalty value to the signature fragment.

For example, the weight processing unit 230 performs a comparison process using additional penalty conditions in addition to calculation of the impacts of the load elements described above. When a signature fragment matching the penalty condition is found, a penalty value may be assigned to the final impact to rearrange the order of the detected signature fragments. In other words, the weight is a value applied to the first impact of the load element, and the penalty value is a value applied to the signature fragment.

The signature reconfiguration unit 240 receives the second impact of each load element output from the weight processing unit 230 and calculates the final load impact of the signature fragment using the second impact. Also, the signature reconfiguration unit 240 checks whether a penalty value is given to the signature fragment before calculating the final load impact. If the penalty value is given, the signature reconfiguration unit 240 sums both the second impact of the load element and the penalty value to calculate the final load impact.

The signature reconfiguration unit 240 also checks whether final load impacts have been calculated for all the signature fragments of the signature. If the final load impacts for all signature fragments have been calculated, the signature reconfiguration unit 240 reconfigures the signature by rearranging each signature fragment in the signature according to the magnitudes of final load impacts. Operations performed through the signature reconfiguration unit 240 have been described in detail with reference to FIGS. 2 and 3, and a duplicated description will be omitted.

The signature reconfiguration apparatus 200 according to the second embodiment of the present disclosure may calculate the impact of the load element reflecting the weight (e.g., considering the signature configuration and the pattern search algorithm). The weights are used to increase the weight when the calculated load generation cost in the load element having a large influence on the search performance is applied to the integrated cost (e.g., the final load impact). By reflecting the adjusted weights depending on the situation, it is possible to increase the probability of detecting the load of the signature and reduce the searching time compared to when the weight is not applied.

FIG. 5 is a conceptual diagram for explaining a method of reconfiguring a signature using the signature reconfiguration apparatus 200 according to the second embodiment of the present disclosure. The example shown in FIG. 5 assumes that, as in the example shown in FIG. 3, a first signature $S_1$ has been selected from the database 20, and the first signature $S_1$ includes a first signature fragment P'A', a second signature fragment P'B' and a third signature fragment P'C' in the order of P'A'-P'B'-P'C'. It is also assumed that the load element inspection unit 220 performs inspection for two load elements. The second embodiment of the present disclosure is substantially the same as the first embodiment except that the weight is taken into consideration. Therefore, the following description is made mainly on the differences from the first embodiment.

The weight processing unit 230 applies weights to the first impacts (the first impact of the first load element and the first impact of the second load element in FIG. 5) of the respective load elements output from the load element inspection unit to calculate the second impacts (the second impact of the first load element and the second impact of the second load element in FIG. 5) of the respective load elements. The example shown in FIG. 5 assumes a situation where the weight for the first load element is higher than the weight for the second load element. For example, it is assumed that both the first impact of the first load element and the second impact of the first load element are 30, and the weight of the first load element and the weight of the second load element are 1.5 and 0.5, respectively. Then, the second impact of the first load element will be 45, and the second impact of the second load element will be 15. Assuming that the first impact of the first load element and the second impact of the first load element are 60 and 30, respectively, and the weight of the first load element and the weight of the second load element are 1.5 and 0.5, respectively, the second impact of the first load element will be 90 and the second impact of the second load element will be 15.

The signature reconfiguration unit 240 calculates a final load impact of each signature fragment by summing the second impacts that are weighted by the weight processing unit 230. Further, the signature reconfiguration unit 240 reconfigures the signature by rearranging the signature fragments in the order of P'B'-P'C'-P'A' according to the magnitudes of the final load impacts upon completing the calculation of the final load impacts of all the signature fragments included in the signature.

FIG. 6 is a block diagram of a signature reconfiguration apparatus 300 according to a third embodiment of the present disclosure. The signature reconfiguration apparatus 300 according to the third embodiment of the present disclosure includes a signature division unit 310, a load element inspection unit 320, a weight processing unit 330, a signature reconfiguration unit 340 and an automata generation unit 350. Here, the signature division unit 310, the load element inspection unit 320, the weight processing unit 330, the signature reconfiguration unit 340, and the automata generation unit 350 are classified according to their functions in order to facilitate understanding of the present disclosure. The signature reconfiguration apparatus 300 may be implemented in the form of a single control unit or software. The signature reconfiguration apparatus 300 may also be implemented as a single-core or multi-core CPU, MPU, or the like. The third embodiment of the present disclosure is substantially the same as the first embodiment or the second embodiment except that load element inspection unit 320 considers N load elements and it further includes the automata generation unit 350 for generating automata to be considered by the load element inspection unit 320. Therefore, the following description is mainly made on the differences from the first embodiment or the second embodiment.

The signature division unit 310 selects one of the signatures stored in the database 20 and divides the signature into a plurality of signature fragments.

The automata generation unit 350 may generate automata for the plurality of signature fragments divided by the signature division unit 310 sequentially or simultaneously. Here, automata represent abstract models for a digital computer, and may have finite states. Finite state automata include a finite number of states, an input, a state transition function, an initial state, and at least one final state. In general, a finite state model is a model for processing inputs that are continuously input. An example of automata generated by the automata generation unit 350 is shown in FIG. 7.

FIG. 7 is a conceptual diagram for explaining the concept of automata (e.g., a finite state automata). In FIG. 7, circles including digits 0 through 5 represent states of the finite automata, and letters a, b and d shown with the arrows represent state transition conditions. If the input character satisfies the state transition condition, the state transitions in the direction of the arrow. For example, the circle with number 0 indicates the start state, and, if "a" is input in the start state, it transitions to the state 1. Further, two concentric circles with number 5 represents the final state. Starting from the start state, when the state reaches the final state as a result of transitions, it means that the character string to be searched has been retrieved. Referring back to FIG. 6.

The load element inspection unit 320 calculates the first impact of each load element with respect to each signature fragment divided by the signature division unit 310. Unlike the first and second embodiments in which the first impact is calculated for two load elements, the load element inspection unit 320 may calculate the first impacts of N (e.g., three, four, or more) load elements. For example, the load elements include at least one of: whether the regular expression syntax indicating an unspecified length or an unspecified data type is included in the signature fragment; the pattern length of the signature fragment; the size of active states of the automata; and the size of the search space of active states of the automata. In FIG. 6, four load elements are shown, but this is merely an example. The load element inspection unit 320 may calculate the first impact of each load element considering some or all of the above load elements, or various load elements other than the above load elements.

The load element inspection unit 320 may calculate the first impacts of some or all of those four load elements, or other load elements different from the load elements described above. In the following, it is assumed that the load element inspection unit 320 includes four inspection modules 321, 322, 323, 324 for calculating the first impacts of four load elements. For example, it is assumed that the first inspection module 321 considers the presence of a regular expression syntax indicating an unspecified length or an unspecified data type, the second inspection module 322 considers the pattern length of the signature fragment, the third inspection module 323 considers the size of active states of the automata and the fourth inspection module 324 considers the size of the search space of active states of the automata. Here, operations performed by the first and second inspection modules 321 and 322 are substantially the same as those performed by the first and second inspection modules 121 and 122 described with reference to FIG. 2, and thus a duplicated description will be omitted.

The third inspection module 323 may assign the first impact of the third load element according to the size of the active states of the automata of the signature fragments generated by the automata generation unit 350. As described above, a large size of active states of automata means that a lot of state transitions are required in the process of searching for a character string. For example, when a signature fragment having automata with a large size of active states is used to detect, it is necessary to satisfy many conditions until matching. Therefore, since the period to keep the transition states and the active state are continuously changed, the period for searching the entire automata may directly affect the search load. Accordingly, the third inspection module 323 may assign a higher value to the first impact of the third load element as the size of the active states is higher, and a lower value as the size of the active states is lower, in consideration of this characteristic.

The fourth inspection module 324 may assign the first impact of the fourth load element according to the size of the search space for active states of the automata of the signature fragment generated by the automata generation unit 350. The memory space reserved for the regular expression syntax, where the number of active states of the automata is small but having an ambiguous matching range or iterative calculations, may be expressed as the size of the search space for active states. This is another key element of the automata verification that may express the load impact separate from the number of active states, and a load impact proportional to the search space size is given.

The weight processing unit 330 calculates the second impacts of respective load elements by reflecting the weights for the first impacts of the respective load elements output from the load element inspection unit 320. That is, the weight processing unit 330 adjusts the first impact values of the respective load elements by reflecting the weights to the first impacts of the respective load elements. Unlike the second embodiment, the weight processing unit 330 applies weights of the third and fourth load elements to the first impacts of the third and fourth load elements output from the third and fourth inspection modules 323 and 324 as well as to the first impacts of the first and second load elements output from the first and second inspection modules 321 and 322 to calculate the second impacts of the first to fourth load elements. Since the matters to be considered when the weights are reflected on the first and second load elements have been described above in detail, the following description will focus on matters to be considered when reflecting the weights on the third and fourth load elements.

The weight processing unit 330 may consider the performance of the security device to which the signature reconfiguration apparatus 300 or the method is applied. The signature reconfiguration apparatus 300 according to embodiments of the present disclosure assumes to be operated on a high-performance system that processes signatures in large capacity network trunks. However, techniques applying embodiments of the present disclosure may operate on a software basis. Thus, the environment of the operating equipment may be a variable. In a system with a small memory, the size of the search space for active states of the automata becomes a key consideration, and it is capable to raise the weight for a pattern with a large search space size as much as possible so that the pattern may be processed later.

Thus, if the signature configuration referred to as the first load element is a regular expression (the regular expression affects the active state of the automata or the search space size for the active state of the automata) and there is little free space in the memory of the security device 10, the weight processing unit 330 may increase the weights of the third load element and the fourth load element relatively. If the signature configuration is simple text, the weight processing unit 330 may increase the weight of the third load element because the number of characters constituting the text affects the number of states of the automata.

Each element representing the load is related to each other. For example, it is assumed that a signature fragment is a text pattern exceeding 100 bytes. A text pattern that exceeds 100 bytes may include, for example, combinations of more than 100 numbers or characters, and the automata generated for the text pattern may include more than 100 states. Accordingly, the size of the states is also relatively large. However, when the signature fragment is a large text pattern, it is difficult to find a completely matching character string, so that the number of iterative calculations is relatively reduced. Therefore, the size of the search space for active states of the automata is not so large.

As another example, since the signature fragment such as '.{4,100}', which represents 4 to 100 repetitions of the same character, is not long, the size of active states of the automata is not large either. However, the size of the search space for active states of the automata could be large because matching possibilities should be ensured for a range of strings of at least 4 bytes to 100 bytes until the end of the search.

As described above, the weight processing unit 330 may apply different weights for each load element (or at least two different weights) considering the performance of the equipment to which the signature reconfiguration apparatus 300 or method according to the embodiments of the present disclosure is applied, the structure of each signature included in the signature list, and the like. Meanwhile, the above describes the situation of increasing or decreasing the weight. However, this is merely an example, and the weight for each load element can be calculated or adjusted according to various conditions or circumstances other than those described above.

The weight processing unit 330 may confirm the penalty information and determine whether to give a penalty value to the signature fragment using the penalty information as in the second embodiment. The method of adjusting the final load impact of the signature fragment using the penalty information has been described in detail with reference to FIG. 4, and a duplicate description will be omitted.

The signature reconfiguration unit 340 receives the second impact of each load element output from the weight processing unit 330 and calculates the final load impact of the signature fragment using the second impact. In addition, the signature reconfiguration unit 340 may calculate the final load impact of the signature fragment by summing both the second impact and the penalty value of each load element when a penalty value is given to the signature fragment. The signature reconfiguration unit 340 then reconfigures the signature by relocating each signature fragment in the signature according to the magnitude of the final load impact. Since the operation performed through the signature reconfiguration unit 340 has been described in detail above, a duplicated description will be omitted.

FIG. 8 is a conceptual diagram for explaining a method of reconfiguring a signature using the signature reconfiguration apparatus 300 according to the third embodiment of the present disclosure. The example shown in FIG. 8 assumes that, as in the examples shown in FIGS. 3 and 5, a first signature $S_1$ has been selected from the database 20, and the first signature $S_1$ includes a first signature fragment P'A', a second signature fragment P'B' and a third signature fragment P'C' in the order of P'A'-P'B'-P'C'. It is also assumed that the load element inspection unit 320 performs inspection for four load elements.

Referring to FIG. 8, the load element inspection unit 320 calculates the first impact of the load element for each of the signature fragments P'A', P'B', P'C' divided by the signature division unit 310. For example, the load element inspection unit 320 may calculate the first impacts of the first to fourth load elements in the order of the signature fragments or in the order of the load elements. As described with reference to FIG. 3, the calculation of the first impact by the load element inspection unit 320 may be performed simultaneously in parallel as well as sequentially. As described with reference to FIG. 6, the first load element may indicate the presence of a regular expression syntax indicating an unspecified length or an unspecified data type in the signature fragment, the second load element may indicate the pattern length of the signature fragment, the third load element may indicate the size of active states of the automata and the fourth load element may indicate the size of the search space for active states of the automata.

The weight processing unit 330 calculates the second impacts of respective load elements by applying weights of the plurality of load elements to the first impacts of the first to fourth load elements output from the load element inspection unit 320. Also, the weight processing unit 330 may calculate the second impact in consideration of the penalty condition and the like.

The signature reconfiguration unit 340 calculates a final load impact of each signature fragment by summing the second impact of each load element whose weight is reflected (or penalty is reflected) by the weight processing unit 330. Further, the signature reconfiguration unit 340 may reconfigure the signature by rearranging the signature fragments in the order of P'B'-P'C'-P'A' according to the magnitudes of the final load impacts upon completion of the calculation of the final load impacts of all the signature fragments included in the signature.

FIG. 9 is a flowchart of a signature reconfiguration method according to an embodiment of the present disclosure. As described above, the signature reconfiguration method according to an embodiment of the present disclosure may reconfigure each signature by reconfiguring each signature fragment included in the signature so that the signature-based abnormal traffic detection technique may be more efficiently performed. The signature reconfiguration method according to an embodiment of the present disclosure may be performed by the apparatus described with reference to FIGS. 1 to 8 (e.g., an apparatus including a plurality of units or a control unit) or by being installed in the security device in the form of software in another embodiment. Hereinafter, a duplicated description from those described above will be omitted.

In step S110, a signature (e.g., the first signature) is selected from signatures stored in the database 20. As described above, the database may have a plurality of signatures in the form of a signature list.

In step S120, the signature (e.g., the first signature) selected in step S110 is divided into a plurality of fragments. For example, in step S120, a signature is received using a parser or the like, and is divided into a plurality of signature fragments (e.g., a unit capable of interpreting the syntax) in consideration of a character string pattern and a regular expression syntax. Since there are various schemes for the syntax analysis performed in step S120, it is not limited to a specific scheme in the present disclosure.

In step S130, a signature fragment among the signature fragments divided in step S120 is selected, and the first impact for each load element of the selected signature fragment is calculated. The load elements include at least one of: whether the regular expression syntax indicating an unspecified length or an unspecified data type is included in the signature fragment; the pattern length of the signature fragment; the size of active states of the automata; and the size of the search space for active states of the automata. For example, in step S130, the first impacts of two, three, four, or more load elements may be calculated for the selected signature fragment. The load elements are not limited to those described above, and other load elements may further be considered. Since the method of calculating the first impact of each load element has been described in detail above, a duplicated description will be omitted.

In step S140, weights for the plurality of load elements are calculated. As described above, the signature reconfiguration method according to an embodiment of the present disclosure calculates weights for the respective load elements in consideration of the signature configuration, the type of the pattern search algorithm, the free space of the system memory, and the like. The method of calculating the weights and the conditions used therefor are described in detail above, and a duplicated description will be omitted.

In step S150, the second impact for each load element is calculated by applying the weights of the plurality of load elements calculated in step S140 to the first impact of each load element calculated in step S130.

After step S150, in the step depicted as block A in FIG. 9, the penalty information is checked, and it is confirmed whether the signature fragment matches the penalty condition included in the penalty information. As a result of the confirmation, a step of assigning a penalty value to the signature fragment matching the penalty condition may be performed. The confirmation step using the penalty condition and the step of assigning a penalty value to a signature fragment matching the penalty condition are not essential. Since the description of these steps has been described in detail above, a duplicated description will be omitted.

In step S160, a final load impact is calculated for each signature fragment by summing the second impacts of respective load elements for each signature fragment.

In step S170, it is checked whether the final load impacts of all signature fragments in the signature selected in step S110 are calculated. As a result of checking, if the final load impacts for all signature fragments are calculated, step S180 is performed. If there are other signature fragments in the signature selected in step S110, steps S130 to S160 may be further performed. Through step S170, steps S130 to S160 may be repeated until the final load impacts for all signature fragments in one signature are calculated.

In the above description, it has been described that steps S130 to S160 are repeatedly performed in the order of signature fragments divided in step S120. However, this is only an example, and steps S130 to S160 may be performed by calculating the first impact, the second impact and the final load impact in parallel for each signature.

Step S180 is performed when the calculation of the final load impact for one signature (e.g., the first signature) is completed. In accordance with the final load impact of each signature fragment, each signature fragment included in the signature is rearranged. As described above, step S180 may be performed by rearranging a signature fragment having a low final load impact on the front of the signature and rearranging a signature fragment having a high final load impact on the rear of the signature.

In step S190, it is checked whether there is another signature in the database 20 (e.g., in the signature list). As a result of checking, if other signatures which are not reconfigured exist, steps S110 to S180 are performed again. Otherwise, the entire process is terminated.

The above exemplary methods according to the present disclosure may be implemented in various ways such as program instructions executed by a processor, software module, microcode, computer program product recorded on a recording medium readable by a computer (including all devices having an information processing function), application, logic circuits, application specific integrated circuit, or firmware. Examples of the computer-readable recording medium include, but are not limited to, ROM, RAM, CD, DVD, magnetic tape, hard disk, floppy disk, hard disk and optical data storage. In addition, the computer-readable recording medium may be distributed over network-connected computer systems so that computer-readable codes may be stored and executed in a distributed manner.

The foregoing description is merely illustrative of the present disclosure, and various modifications may be made by those skilled in the art without departing from the spirit of the present disclosure.

What is claimed is:

1. A method of reconfiguring signature for signature-based abnormal traffic detection, the method comprising:
    selecting a signature from a signature list stored in a database and dividing the selected signature into a plurality of signature fragments;
    identifying a first impact for each of a plurality of load elements by inspection of the plurality of signature fragments for the plurality of load elements;
    identifying a second impact for each of the plurality of load elements by applying a weight for each of the plurality of load elements to the first impact;
    identifying a final load impact for each signature fragment by summing up the corresponding second impact to each signature fragment among the identified second impact for each of the plurality of load elements; and
    rearranging an order of the plurality of signature fragments according to a magnitude of the identified final load impact,
    wherein the weight is adjusted according to at least one of a signature configuration, a pattern search algorithm, and a specification of a security device performing signature-based abnormal traffic detection, and
    wherein the first impact is identified according to at least one of a syntax of a pattern included in the signature fragment, a length inspection so that a magnitude of the first impact increases as a length of the signature fragment decreases, or a size of active states of automata of the signature fragment.

2. The method of claim 1, wherein at least two of the weights for the plurality of load elements are different from each other.

3. The method of claim 1, wherein the inspection for the plurality of load elements comprises a syntax inspection of the pattern included in the signature fragment.

4. The method of claim 1, wherein the inspection for the plurality of load elements comprises the length inspection of the signature fragment.

5. The method of claim 1, wherein the inspection for the plurality of load elements comprises an inspection of the size of active states of automata for the signature fragment.

6. The method of claim 1, wherein the inspection for the plurality of load elements comprises an inspection of a size of a search space for active states of automata for the signature fragment, and
    wherein the first impact is identified based on the size of the search space for active states of the automata of the signature fragment.

7. The method of claim 1, further comprising:
    determining whether the plurality of signature fragments match a predetermined penalty condition; and
    assigning a penalty value to the signature fragment that matches the penalty condition, and
    adding the assigned penalty value to the identified final load impact in case of the signature fragment to which the penalty value is assigned.

8. An apparatus of reconfiguring signature for signature-based abnormal traffic detection, the apparatus comprising:
    a memory;
    a signature division processor configured to select a signature from a signature list stored in a database and dividing the selected signature into a plurality of signature fragments;
    a load element inspection processor configured to inspect the plurality of signature fragments for a plurality of load elements to identify a first impact for each of the plurality of load elements;
    a weight processing processor configured to apply a weight for each of the plurality of load elements to the first impact to identify a second impact for each of the plurality of load elements; and
    a signature reconfiguration processor configured to calculate a final load impact for each signature fragment by summing corresponding second impact to each signature fragment among the calculated second impact for each of the plurality of load elements and rearranging an order of the plurality of signature fragments according to a magnitude of the calculated final load impact,
    wherein the weight is adjusted according to at least one of a signature configuration, a pattern search algorithm, and a specification of a security device performing signature-based abnormal traffic detection, and
    wherein the first impact is identified according to at least one of a syntax of a pattern included in the signature fragment, a length inspection so that a magnitude of the first impact increases as a length of the signature fragment decreases, or a size of active states of automata of the signature fragment.

9. An apparatus of reconfiguring signature for signature-based abnormal traffic detection, comprising:
a control processor; and
a memory containing instructions for:
selecting a signature from a signature list stored in a database and dividing the selected signature into a plurality of signature fragments;
identifying a first impact for each of a plurality of load elements by inspection of the plurality of signature fragments for the plurality of load elements;
identifying a second impact for each of the plurality of load elements by applying a weight for each of the plurality of load elements to the first impact;
identifying a final load impact for each signature fragment by summing up the corresponding second impact to each signature fragment among the identified second impact for each of the plurality of load elements; and
rearranging an order of the plurality of signature fragments according to a magnitude of the identified final load impact,
wherein the weight is adjusted according to at least one of a signature configuration, a pattern search algorithm, and a specification of a security device performing signature-based abnormal traffic detection, and
wherein the first impact is identified according to at least one of a syntax of a pattern included in the signature fragment, a length inspection so that a magnitude of the first impact increases as a length of the signature fragment decreases, or a size of active states of automata of the signature fragment.

10. The apparatus of claim 9, wherein at least two of the weights for the plurality of load elements are different from each other.

11. The apparatus of claim 9, wherein the inspection for the plurality of load elements comprises a syntax inspection of the pattern included in the signature fragment.

12. The apparatus of claim 9, wherein the inspection for the plurality of load elements comprises the length inspection of the signature fragment.

13. The apparatus of claim 9, wherein the inspection for the plurality of load elements comprises an inspection of the size of active states of automata for the signature fragment.

14. The apparatus of claim 9, wherein the inspection for the plurality of load elements comprises an inspection of a size of a search space for active states of automata for the signature fragment, and
wherein the first impact is identified based on the size of the search space for active states of the automata of the signature fragment.

15. The apparatus of claim 9, further comprising instructions for:
determining whether the plurality of signature fragments match a predetermined penalty condition; and
assigning a penalty value to the signature fragment that matches the penalty condition, and
adding the assigned penalty value to the identified final load impact in case of the signature fragment to which the penalty value is assigned.

* * * * *